US 6,643,413 B1

(12) United States Patent
Shum et al.

(10) Patent No.: US 6,643,413 B1
(45) Date of Patent: Nov. 4, 2003

(54) MANIFOLD MOSAIC HOPPING FOR IMAGE-BASED RENDERING

(75) Inventors: Heung-Yeung Shum, Beijing (CN); Li Feng Wang, Beijing (CN); Xin Tong, Beijing (CN); Jin-Xiang Chai, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/536,485

(22) Filed: Mar. 27, 2000

(51) Int. Cl.$^7$ .................................................. G06K 9/40
(52) U.S. Cl. ...................... 382/284; 382/154; 382/294; 345/629
(58) Field of Search ................................. 382/294, 295, 382/296, 300, 284, 154; 345/435, 619, 629, 639, 634

(56) References Cited

U.S. PATENT DOCUMENTS 6,097,854 A * 8/2000 Szeliski et al. ............. 382/284
6,393,163 B1 * 5/2002 Burt et al. .................. 382/294

OTHER PUBLICATIONS

Chen and Williams, View Interpolation for image synthesis, Computer Graphics (SIGGRAPH'93), pp. 279–288, Aug. 1993.
Chen, QuickTime VR—an image–based approach to virtual environment navigation, Computer Graphics (SIGGRAPH'95), pp. 29–38, Aug. 1995.
Gortler, Grzeszczuk, Szeliski, Cohen, The lumigraph, in Computer Graphics Proceedings, Annual Conference Series, pp. 43–54, Proc. ISGGRAPH'96 (New Orleans), Aug. 1996, ACM SIGGRAPH.
Levoy, Hanrahan, Light–field rendering, in Computer Graphics Proceedings, Annual Conference Series, pp. 31–42, Proc. SIGGRAPH'96 (New Orleans), Aug. 96, ACM SIGGRAPH.

Mark, McMillan, Bishop, Post–rendering 3d warping, in Proc. Symposium on 13D Graphics, pp. 7–16, 1997.
McMillan, An image–based approach to three–dimensional computer graphics, technical report, ph.d. dissertation, UNC Computer Science TR97–013, 1999.
Peleg, Herman, Panoramic mosaics by manifold projection, in IEEE Computer Soc'y Conference on Computer Vision and Pattern Recognition (CVPR'97), pp. 338–343, San Juan, Puerto Rico, Jun. 1997.
M. Ramasubramanian, S. Pattanaik, D. Greenberg, A perceptually based physical error metric for realistic image synthesis, Computer Graphics (SIGGRAPH'99), pp. 73–82, Aug. 1999.
Shum, He, Rendering with concentric mosaics, in Proc. SIGGRAPH 99, pp. 299–306, Aug. 1999.
Zorin, Barr, Correction of geometric perceptual distortions in pictures, Computer Graphicws (SIGGRAPH'95), pp. 257–264, Aug. 1995.
A. Lippman, Movie Maps, an application of the optical videodisc to computer graphics, Computer Graphics (SIGGRAPH'80), 14(3):32–43, Jul. 1980.

* cited by examiner

Primary Examiner—Bhavesh M Mehta
Assistant Examiner—Ali Bayat
(74) Attorney, Agent, or Firm—Lyon & Harr, L.L.P.; Craig S. Fischer

(57) ABSTRACT

The invention relates to manifold mosaic hopping for image-base rendering (IBR). In one embodiment, a set of manifold mosaics is constructed. Depending on the desired application, the mosaics can be concentric mosaics, parallel mosaics, as well as other types of mosaics. Each mosaic represents a number of unique viewpoints that different from one another in only one direction. From a current camera or viewing position within the set of mosaics, a new position can be moved to, such that the movement is continuous over any one mosaic, and is discrete across the mosaics. An image is rendered by local warping, without interpolation of more than one mosaic.

25 Claims, 11 Drawing Sheets

MANIFOLD MOSAIC HOPPING FOR IMAGE-BASED RENDERING

FIELD OF THE INVENTION

The invention relates generally to image-based rendering, and more specifically to using manifold mosaics to accomplish image-base rendering.

BACKGROUND OF THE INVENTION

Image-based rendering (IBR) in general simulates a continuous range of virtual camera viewpoints of a scene or object from a discrete set of input images of the scene or object. IBR can be used for a variety of different applications. For example, a currently popular application is to use IBR in conjunction with electronic commerce-type applications on the Internet. A user interested in seeing a car's interior or exterior from different viewpoints, for example, may be able to rotate inside a virtual camera inside the car's interior, and zoom in and out to see more or less of the interior, and may also be able to rotate a virtual camera around the car's exterior. Thus, using IBR in such instances enables consumers to better see physical real-world objects that they may desire to purchase, allowing those consumers to make better-informed decisions.

Within the prior art, IBR has been accomplished in large part by using what is know as view interpolation. View interpolation generally involves using a number of known views to generate a desired view, using interpolation of the known views. View interpolation is, however, a difficult task to accomplish. For example, feature correspondence—the corresponding of features, such as pixels or objects, within one of the known views to one or more of the other of the known views—usually needs to be accurately established. Correspondence is particularly difficult when the two known views, or images, have been taken from distant viewpoints.

However, when accurate depth information of a to-be-rendered image is available—that is, information regarding the depth of the desired view relative to a subject object or scene—the image can be rendered from a close known view by accomplishing what is known as warping. That is, the close known view is modified according to its depth. However, providing precise depth information regarding a to-be-rendered image is generally difficult to accomplish.

Many prior art IBR techniques solve the difficulties of correspondence and precise depth information by using a substantial number of images. To render an image at a new viewpoint, these techniques generally select nearby rays of known images, and interpolate them. Constant depth assumptions are made about the depth of the scene in order to locate optimal close rays, for optimal rendering quality. However, the large number of images needed for these techniques means that a large amount of data is required, which is undesirable for Internet and other applications, where the bandwidth over which the images will be transmitted may be low, resulting in inconveniently long transmission times, and/or where the storage space available for the images may be relatively small, such as in specialized devices like Internet appliances that may not have large hard disk drives or similar types of storage devices.

To solve this problem, the prior art typically compromises the extent to which the subject scene can be viewed by the user by constraining the motion of the virtual rendering camera. For example, some systems only allow users to explore large environments at pre-specified locations. However, even though a continuous change in viewing directions at each location is allowed, such systems can only jump among the pre-specified locations when a different viewing location is desired. This causes visual discontinuity and discomfort for the user. Thus, while the amount of data necessary for such IBR techniques can be reduced, the compromise is that perceived continuous virtual camera movement can be lost. Unfortunately, perceived continuous virtual camera movement is generally considered to be important for a user to smoothly navigated within a virtual environment.

For this and other reasons, therefore, there is a need for the present invention.

SUMMARY OF THE INVENTION

The invention relates to manifold mosaic hopping for image-base rendering (IBR). In one embodiment, a set of manifold mosaics, such as concentric mosaics, is constructed. Each mosaic represents a number of unique viewpoints that different from one another in only one direction. For example, in the case of concentric mosaics, the viewpoints in a given mosaic differ from one another only in the angular direction, in the r-theta domain. From a current virtual camera or viewing position within the set of mosaics, a new position can be moved to, such that the movement is continuous over any one mosaic, and is discrete across the mosaics. For example, in the case of concentric mosaics, movement is continuous over a given mosaic's circle, and is discrete when moving in the radial direction across mosaics. An image is rendered by local warping, without interpolation of more than one mosaic.

Embodiments of the invention provide for a reduction in the amount of data—that is, the number of images—needed to render a new image based on a new viewpoint of a scene or object, without unduly constraining the locations at which the new image can be rendered. The number and location of the manifold mosaics can be selected such that the discrete movement across mosaics perceptually appears to the user as continuous movement. That is, the number and location of the mosaics can be selected to take advantage of insensitive characteristics of the human eye, such that perceived smooth movement is still achieved even though discrete movement is in fact taking place.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
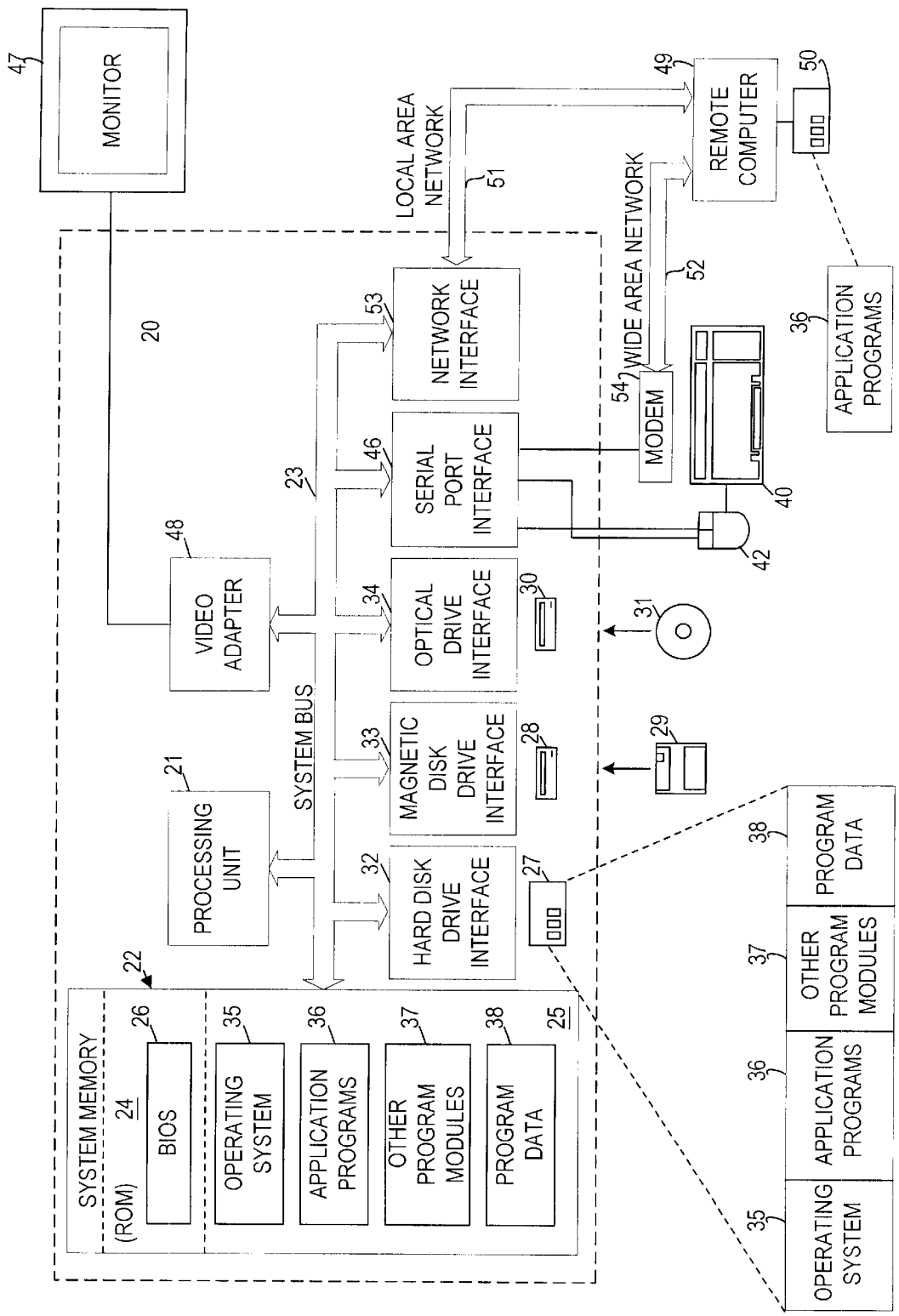
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Image-Based Rendering

Figure 2:
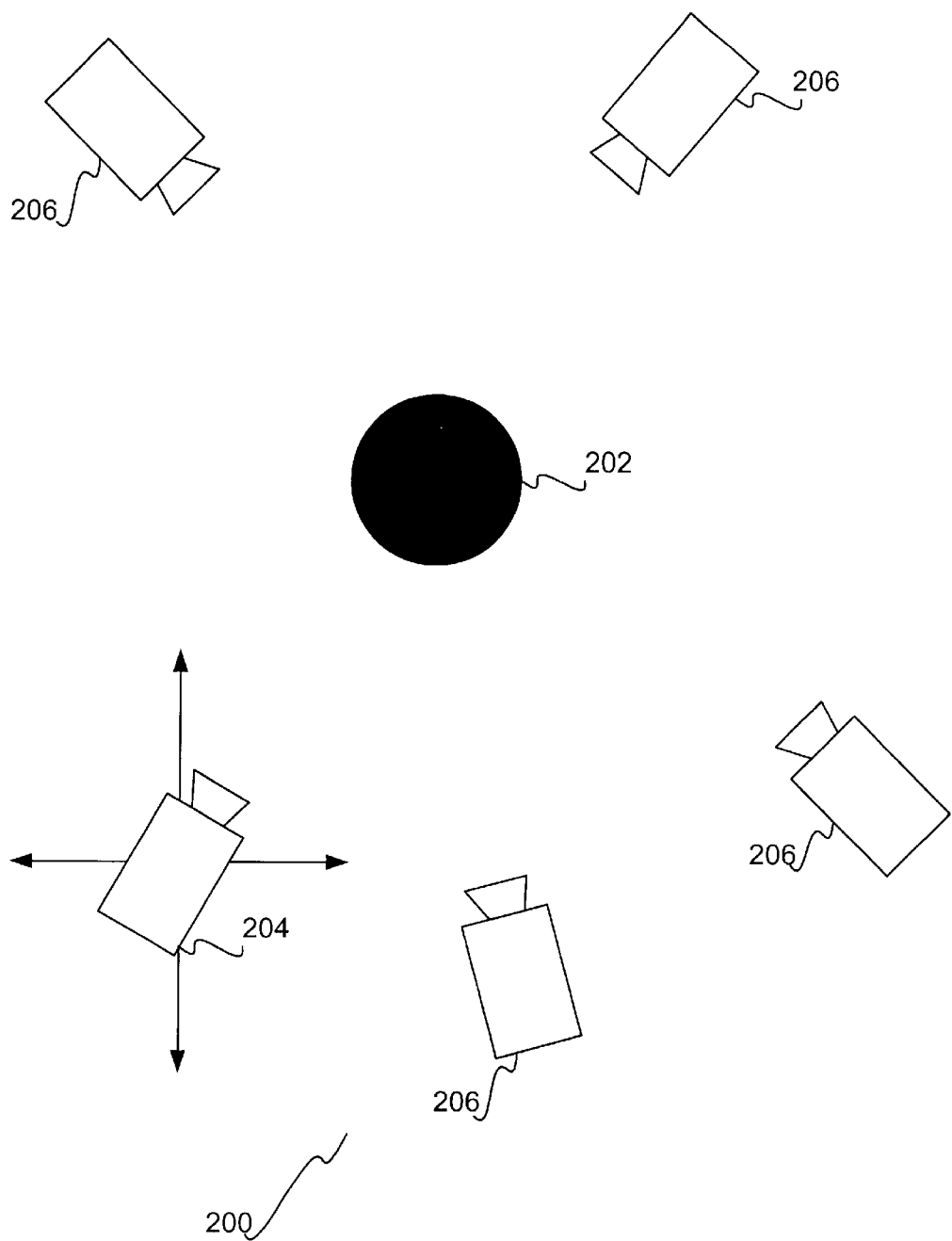
FIG. 2 is a top-view diagram of an example scene in conjunction with which image-based rendering (IBR) can be performed.

In this section of the detailed description, an overview of image-based rendering (IBR), such as can be performed in conjunction with embodiments of the invention, is described. In FIG. 2, a top-view diagram of a scene 200 including an object 202 is shown. The user is desirably able to move and rotate a virtual camera 204 throughout the scene 200, as indicated by the arrows extending from the camera 204, so that the virtual camera represents a desired viewpoint of the object 202. An image representing this viewpoint of the object 202 is then rendered.

This image is rendered from already taken images from viewpoints of known real cameras 206. As shown in FIG. 2, there are four such cameras 206, at various distances from and rotations relative to the object 202. However, this is for example and illustrative purposes only. A factor in IBR is to select the number and locations of the cameras 206, so that an image representing the viewpoint of the virtual camera 204 can be rendered based on the images representing the viewpoints of the cameras 206. As is described specifically, embodiments of the invention relate to using a number of manifold mosaics as the images of the known viewpoints, from which a new image is rendered.

It is noted that the example of FIG. 2 described is only one type of image-based rendering (IBR). While embodiments of the invention are amenable to this type of IBR, the invention itself is not itself so limited. Specifically, the example of FIG. 2 is IBR in which the cameras are outside looking inwards on an object. Embodiments of the invention are also amenable to other types of IBR, such as cameras that are inside looking outwards within a scene.

Manifold Mosaics for IBR: Concentric Mosaics

In this section of the detailed description, a particular embodiment of the invention relating to manifold mosaics that are concentric mosaics is described in detail to present the invention. However, the invention itself is not limited to manifold mosaics that are concentric mosaics; as will be described in the next section of the detailed description, other manifold mosaics are also amenable to the invention. That is, concentric mosaics are used as a specific type of manifold mosaics for descriptive purposes in this section of the detailed description. The embodiment of the invention described in this section particularly relates to image-based rendering (IBR) in which the cameras are inside looking outward.

Figure 3:
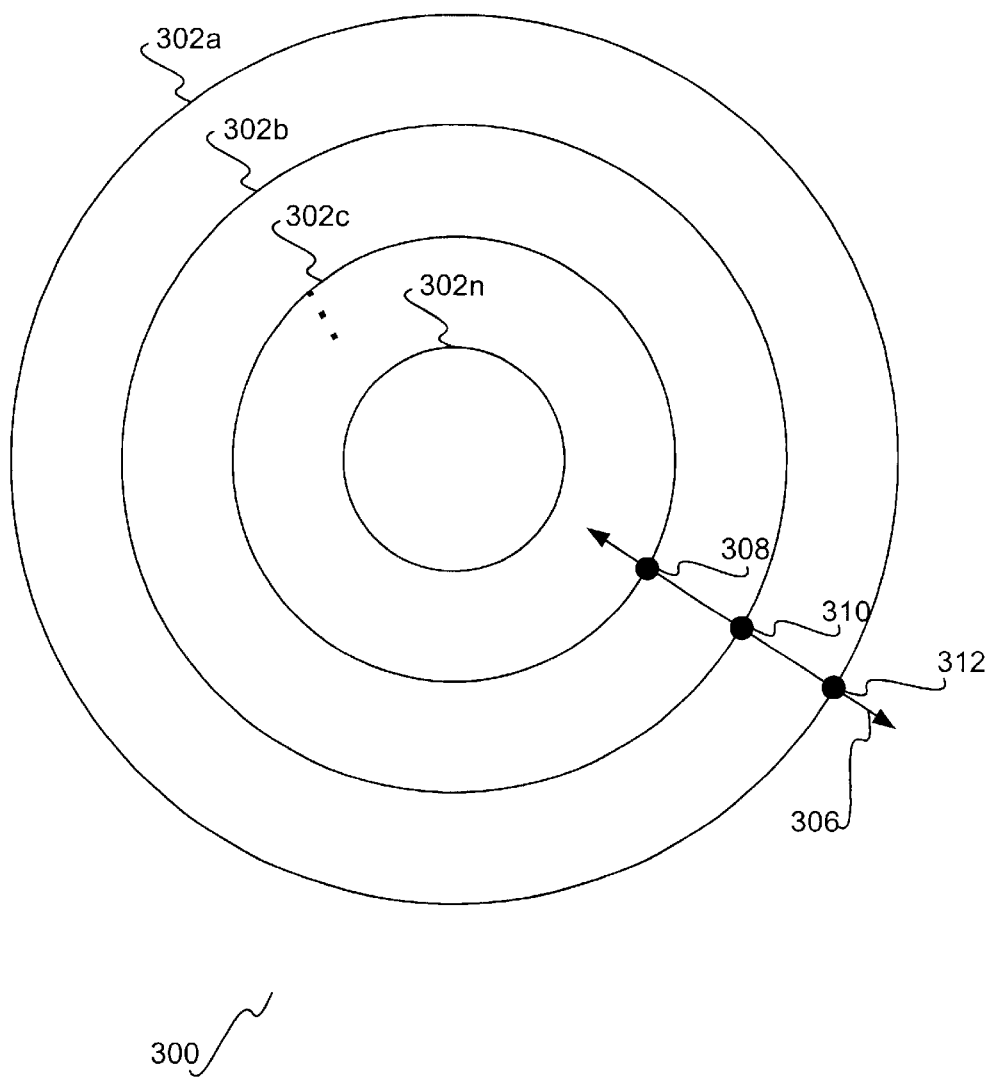
FIG. 3 is a diagram of a set of concentric manifold mosaics, according to an embodiment of the invention.

First, a general overview of the embodiment of the invention utilizing manifold mosaics that are concentric mosaics is presented. In FIG. 3, a diagram of a scene 300 having a set of concentric mosaics 302a, 302b, 302c, ..., 302n is shown. The set of concentric mosaics 302a, 302b, 302c, ..., 302n is a particular type of a set of manifold mosaics having a predetermined spatial relationship. In particular, the spatial relationship of the set of concentric mosaics 302a, 302b, 302c, ..., 302n is that each of them is concentric, such that they have a common center point.

The concentric mosaics are a set of multiperspective panoramas that are formed by rays taken along concentric circles. Specifically, each mosaic represents a number of unique viewpoints that differ from one another in only one direction. That is, on any of the concentric mosaics 302a, 302b, 302c, ..., 302n, any viewpoint represented by a virtual camera has the same radial distance from the center point, but varies from other viewpoints on the same mosaic only in an angular direction, when using a (radial direction, angular direction) ray space.

A viewpoint represented by a virtual camera is constrained to move discretely across mosaics in a radial direction, as represented by the line 306 of FIG. 3. That is, when moving radially across mosaics, an image represented by the viewpoint of the virtual camera can only be rendered on a mosaic, and not in-between mosaics. This discrete movement is also referred to herein as hopping, radial hopping (this term specifically in the context of this section of the detailed description only), or manifold hopping. For example, along the line 306, images can be rendered at the viewpoints 308, 310 and 312, but not between the viewpoints 308 and 310, or the viewpoints 310 and 312. While when the number of circles is small, hopping between circles appears visually discontinuous to the user, as will be described, the number and location of the circles can be selected to provide perceptually smooth continuous movement. That is, a maximum distance between two adjacent mosaics, as will be described, can be determined based on a predetermined smooth perception threshold related to the human visual system.

A viewpoint represented by a virtual camera can move continuously on a given circular mosaic. That is, along any of the concentric mosaics 302a, 302b, 302c, . . . , 302n, the image represented by the viewpoint of the virtual camera can be rendered, regardless of where the viewpoint is on a particular mosaic. Thus, it is stated that movement of a position within the set of manifold mosaics is continuous over any one mosaic, and is discrete across mosaics. In the particular case of FIG. 3, the movement within the set of manifold mosaics is continuous when moving on a given circular, and is discrete in the radial direction across mosaics.

Manifold mosaics, particularly concentric mosaics, are now described in more detail, As has been noted, concentric mosaics are multiperspective panoramas constructed from rays taken along concentric circles. Concentric mosaics constitute a three-dimensional (3D) plenoptic function because they are sampled naturally over three parameters: rotation angle, radius, and vertical elevation. Concentric mosaics can be captured by using an off-centered video camera rotating along a circle.

Rendering with concentric mosaics can be described in relation to a signed Hough space representation for sampled rays. The Hough transform is known within the art to be a good representation for lines, but is generally not suitable for representing rays that are directional. Therefore, a conventional Hough space can be augmented to become a signed Hough ray space, which can also be referred to as an oriented line representation, by using the following right-hand rule: a ray that is directed in a counter-clockwise fashion about the coordinate center is labeled positive, and otherwise is labeled negative. Thus, a positive ray is represented by (r, θ), where its negative counterpart is (−r, θ), where r is always a positive number.

Figure 4:
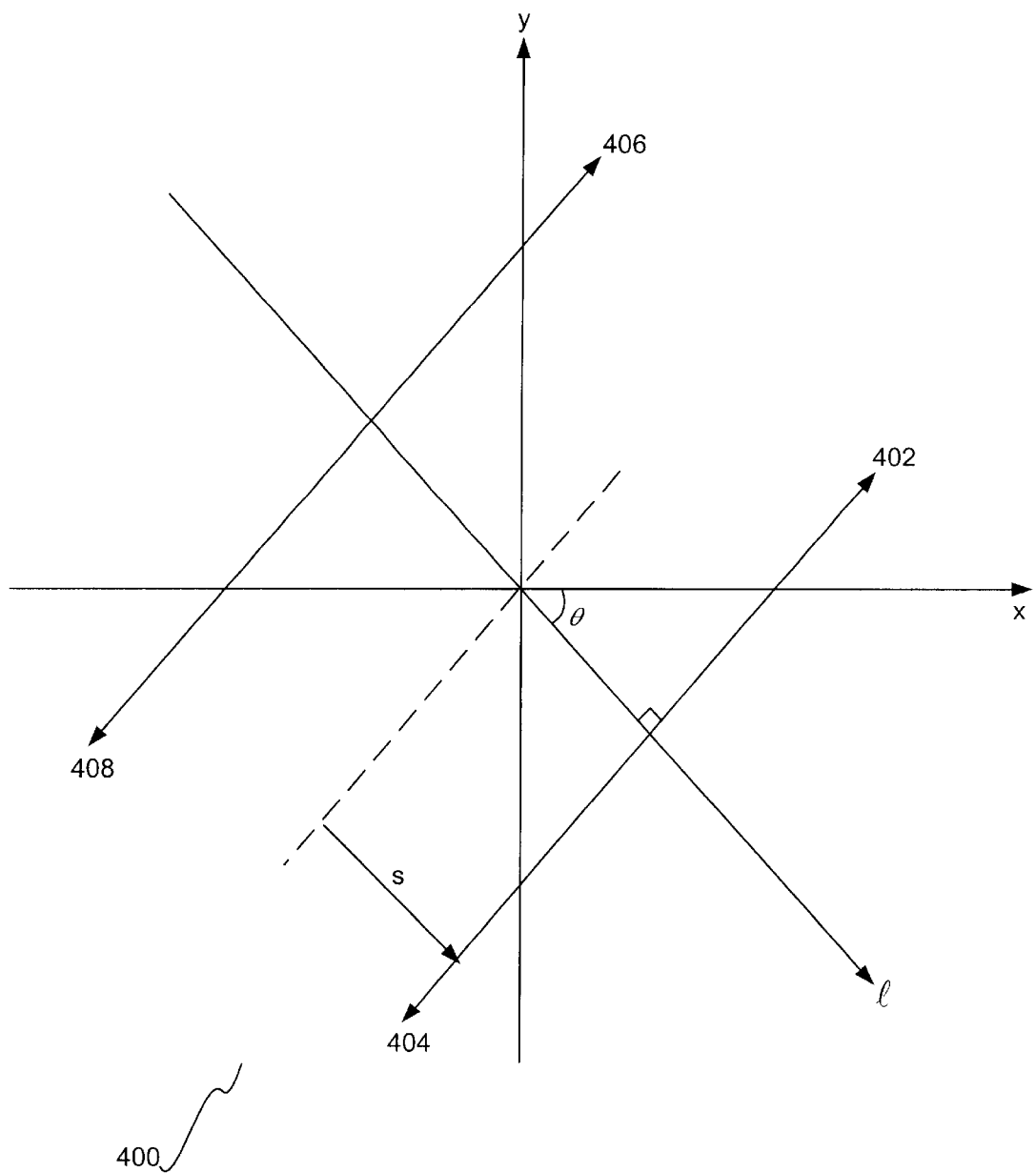
FIG. 4 is a diagram of rays in Cartesian space.
Figure 5:
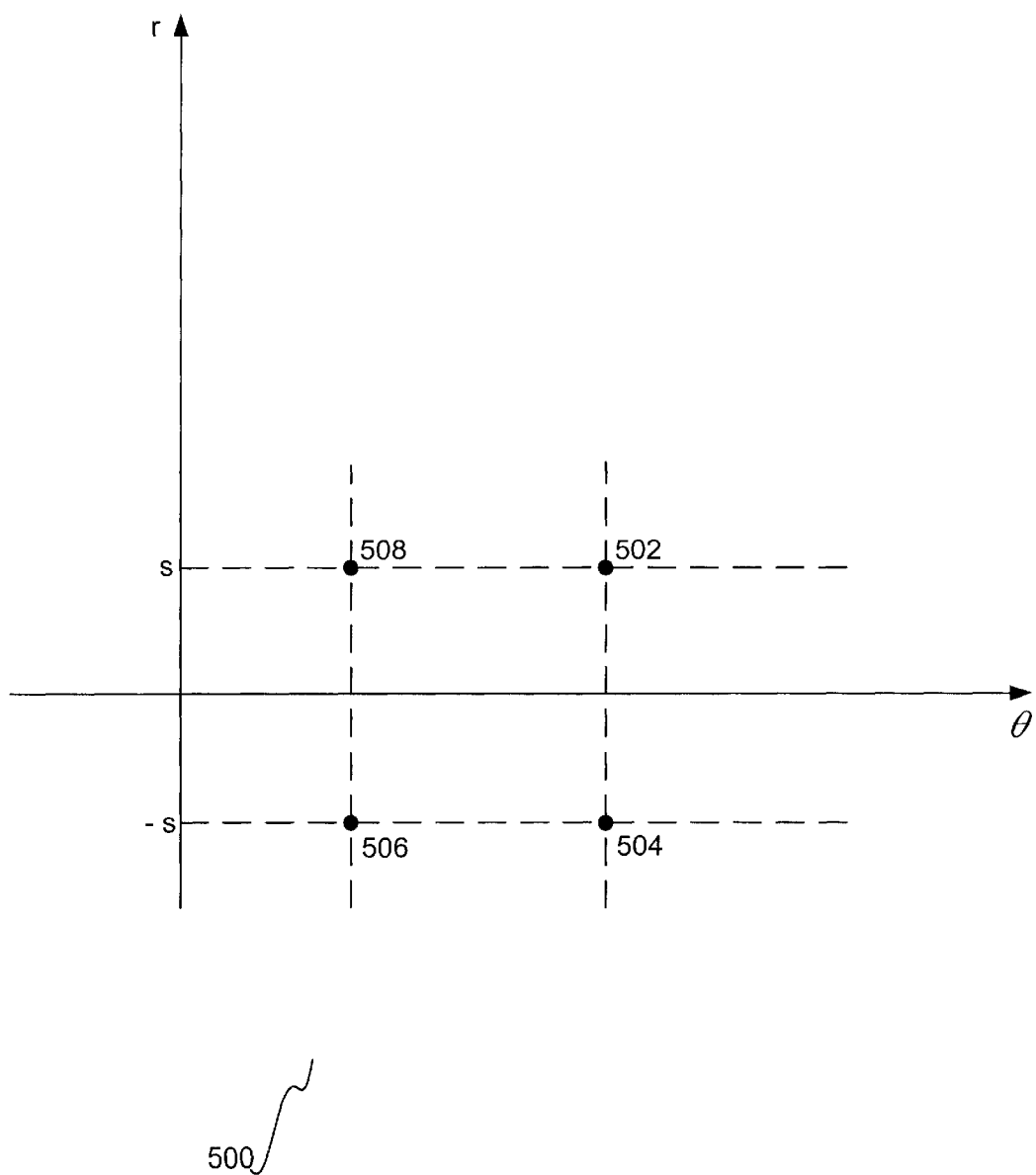
FIG. 5 is a diagram of the rays of FIG. 4 transformed to points in augmented (signed) Hough space.

This is shown by way of illustration. In FIG. 4, there is a Cartesian two-dimensional (2D) ray space 400 having four different rays 402, 404, 406 and 408. All of the rays 402, 404, 406 and 408 are parallel to each other, and are the same distance s away from a line parallel thereto running through the origin. Furthermore, the rays 402 and 404 are directed in opposite directions, while the same is true for the rays 406 and 408. The corresponding points for the four rays 402, 404, 406 and 408 are shown in the signed Hough ray space 500 of FIG. 5 as the points 502, 504, 506 and 508, respectively. Thus, the points 502 and 508 have the same value s for r in the (r, θ) space 500, while the points 504 and 506 have the same value −s for r. The points 506 and 508 have the same value for θ in the space 500, while the points 502 and 504 also have the same value θ.

Figure 6:
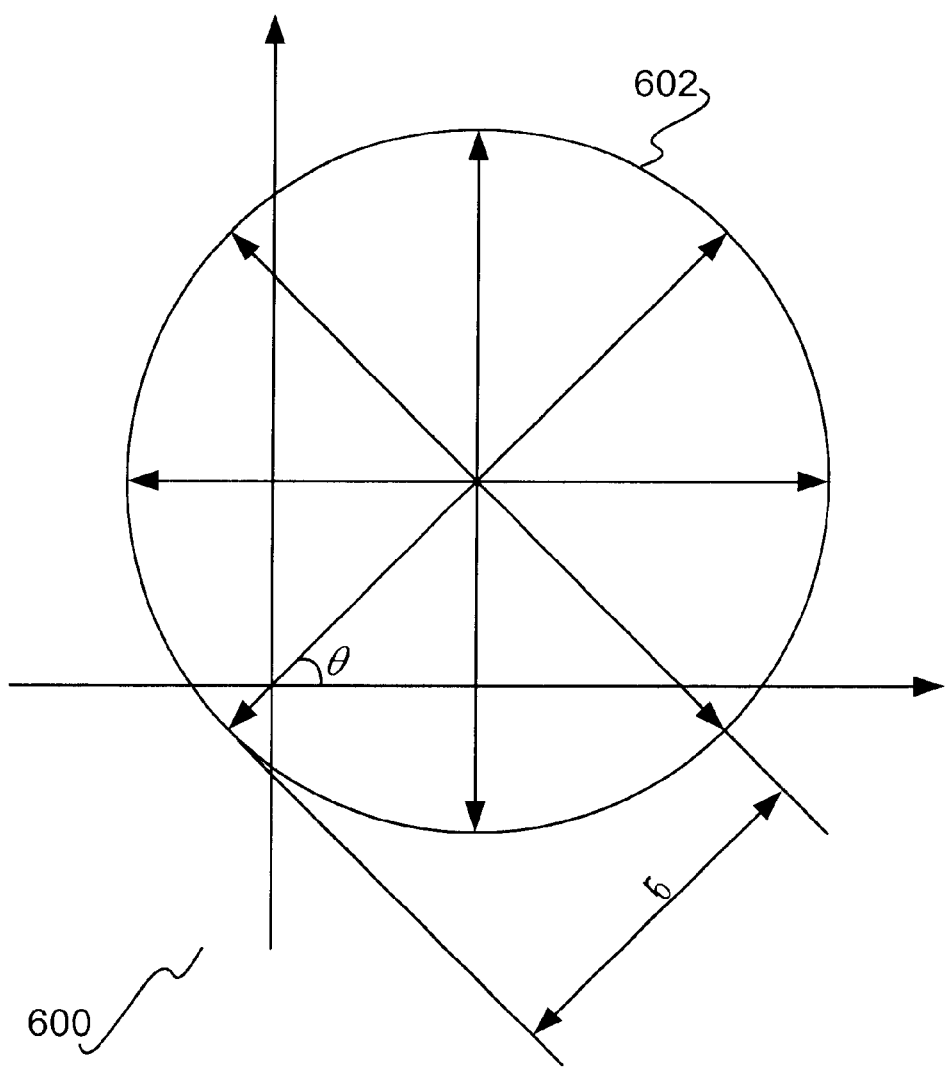
FIG. 6 is a diagram of a panoramic image mosaic in Cartesian space.
Figure 7:
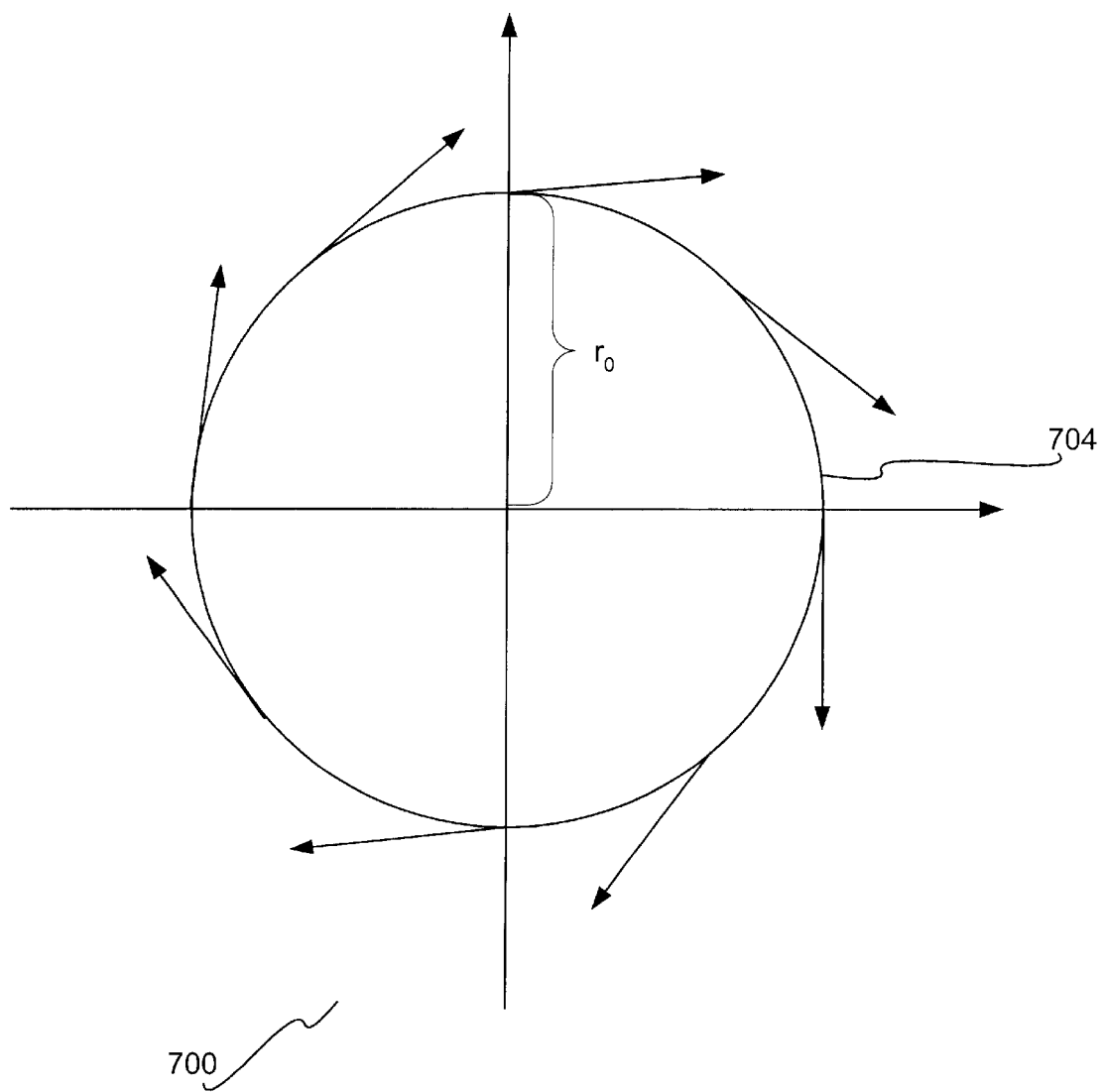
FIG. 7 is a diagram of a concentric mosaic in Cartesian space.
Figure 8:
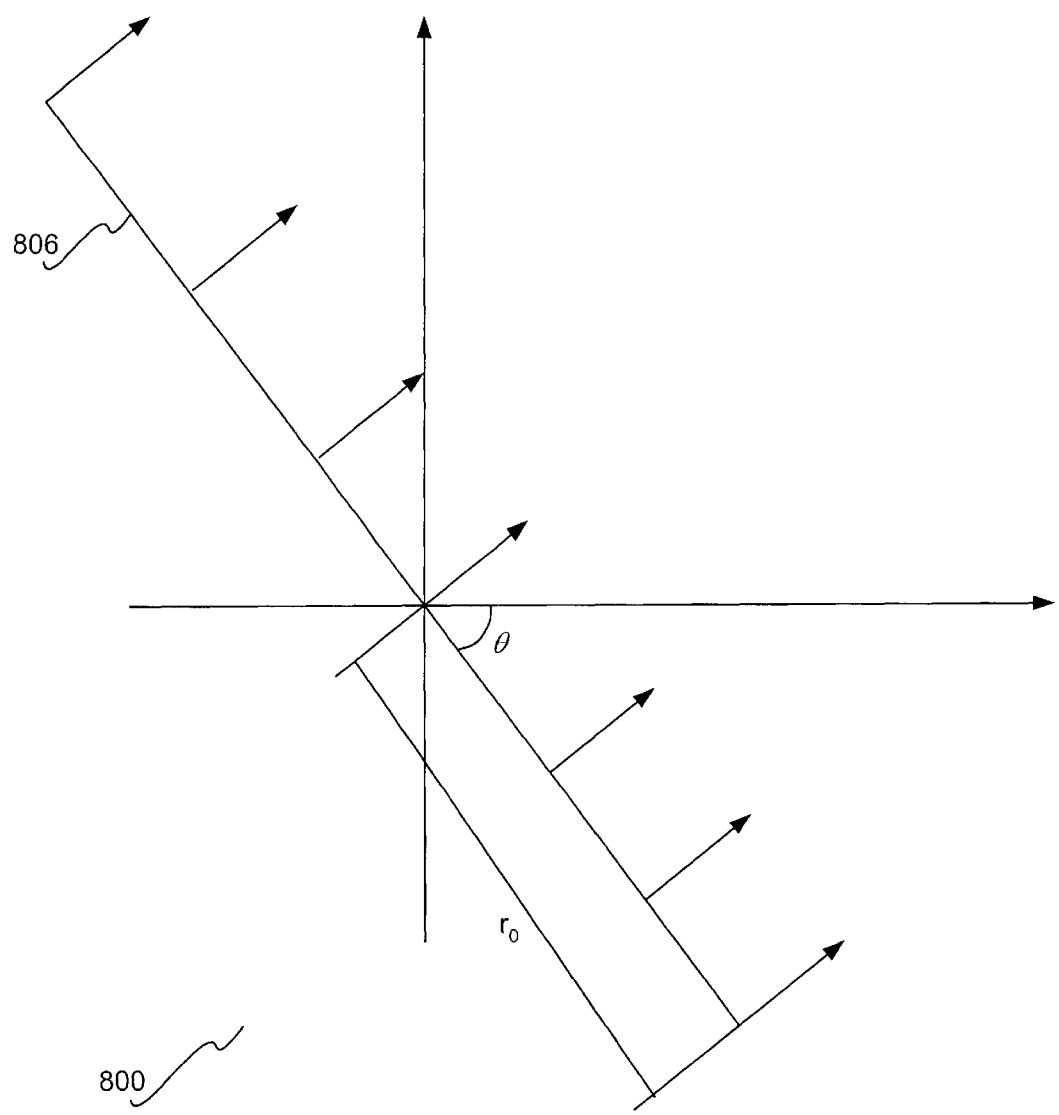
FIG. 8 is a diagram of a parallel projection mosaic in Cartesian space.
Figure 9:
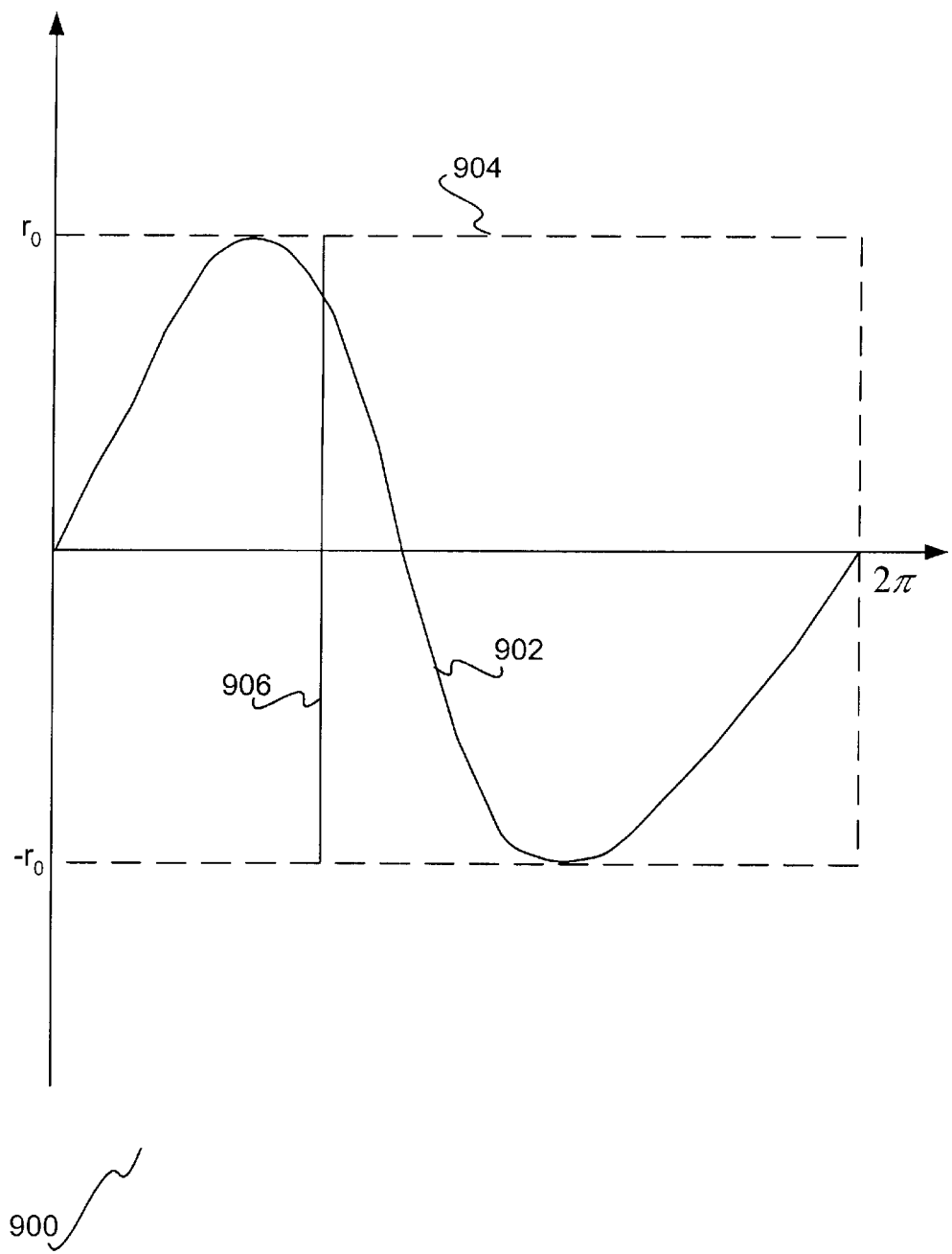
FIG. 9 is a diagram of the mosaics of FIGS. 6, 7, and 8 as have been transformed in augmented (signed) Hough space.

Three more example representations of transformations between Cartesian space and augmented (signed) Hough space are shown in FIGS. 6, 7, 8, and 9. In FIG. 6, within the Cartesian space 600, there is a panoramic image mosaic 602, having rays collected at a fixed viewpoint in the space 600. In FIG. 7, within the Cartesian space 700, there is a concentric mosaic 704, having rays tangential to the mosaic 704. In FIG. 8, within the Cartesian space 800, there is a parallel projection mosaic 806, having rays in one direction parallel to each other, and perpendicular to the mosaic 806. The mosaics 602 of FIG. 6, 704 of FIG. 7, and 806 of FIG. 8 have in the augmented Hough space 900 of FIG. 9 corresponding sample curves 902, 904 and 906, respectively, where the term curve is used inclusively to also encompass straight line segments. Specifically, the panoramic image mosaic 602 of FIG. 6 has the corresponding sample curve 902 of FIG. 9 that is sinusoidal; the concentric mosaic 704 of FIG. 7 has the corresponding sample curve 904 of FIG. 9 that is a horizontal line; and, the parallel projection mosaic 806 of FIG. 8 has the corresponding sample curve 906 of FIG. 9 that is a vertical line.

Thus, captured perspective images can be transformed into samples in the parameter, or augmented Hough, space. Rendering a new view in a scene is equivalent to extracting a partial or complete sinusoidal curve from the signed Hough space. Determining the depth of the scene can also be defined as a curve-fitting problem that is constrained by a specific model.

As has been described, in conjunction with a concentric mosaics embodiment of the invention, movement on any concentric mosaic is continuous, while movement in a radial across concentric mosaics is discrete. It is noted that manifold hopping captures horizontal parallax and lighting changes, because of the viewpoint variations. Hopping is now described in more detail, in particular, the interval at which manifold mosaics desirably are located to ensure perceptual visual continuity from a human eye stand point is described.

Figure 10:
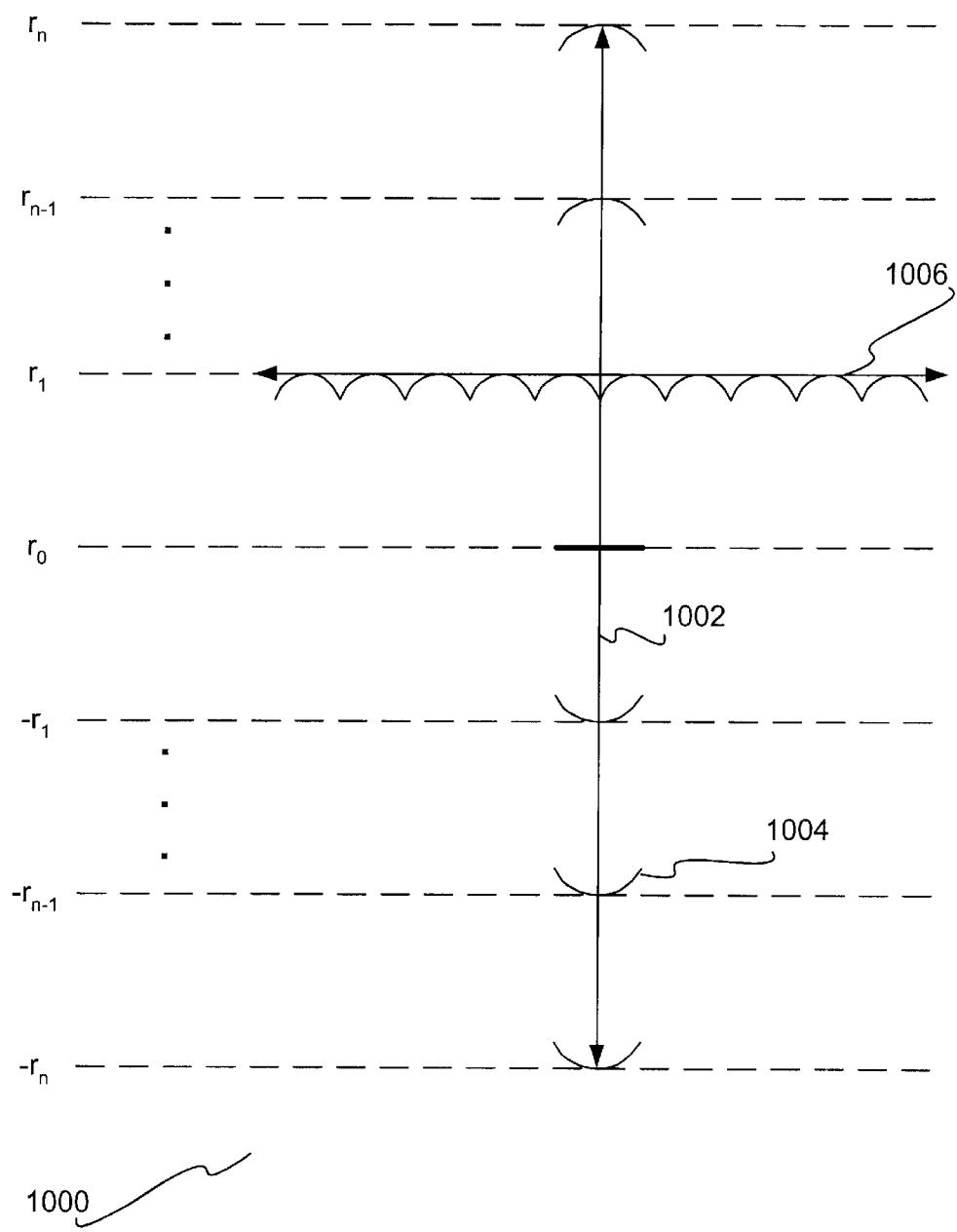
FIG. 10 is a diagram of discrete movement across concentric mosaics and continuous movement on a concentric mosaic, in augmented (signed) Hough space, according to an embodiment of the invention; and, FIG. 11 is a flowchart of a method according to an embodiment of the invention.

Thus, with radial hopping, a virtual camera is restricted to discrete movement along any radial direction. Both radial hopping and continuous movement along a mosaic is shown in signed Hough space in FIG. 10. Thus, in the signed Hough space 1000 of FIG. 10, movement along the radial direction represented by the line 1002 is limited to discrete "hops" at concentric mosaics having radii $r_0, r_1, \ldots, r_{n-1}, r_n$. At any viewpoint along the line 1002 coincident with a concentric mosaic, there is a segment of a sinusoidal curve, such as the segment 1004, that can be approximated by a line segment. Equivalently, at each rendering viewpoint, a perspective image is approximated by part of a concentric mosaic. Thus, the smaller the hopping interval, the better the visual quality, while the larger the hopping interval, the less data there is needed. However, it is noted that in manifold hopping, a relatively large hopping interval can still provide for perceptually continuous radial movement to human beings, as is now described.

The efficiency and effectiveness of radial hopping depend generally on the size of sample intervals along both the radial and angular directions. The angular direction is sampled uniformly and desirably densely to ensure continuous rotation. The maximum hopping interval Δr allows for smooth visual perception is determined by the threshold.of the horizontal pixel flow $D_o$, in angular measurement, between two neighboring frames. It is noted that this threshold is related to the human visual system, and is also referred to as the smooth perception threshold. It is also noted that vertical parallel is ignored, due to the nearly horizontal epipolar geometry between neighboring concentric mosaics.

A point is considered at a distance $R_0$ in two concentric mosaics $r_n$ and $r_{n+1}$, respectively. The horizontal parallax Δθ between two observed pixels A and B at the two concentric mosaics satisfies $$\Delta \theta = \sin^{-1}\left(\frac{r_n + \Delta r}{R_0}\right) - \sin^{-1}\left(\frac{r_n}{R_0}\right) \le D_0 \qquad (1)$$

which leads to the maximum hopping size—that is, the maximum distance between adjacent concentric mosaics $$\Delta r = \sqrt{R_0^2 - r_n^2} \sin D_0 + r_n \cos D_0 - r_n \quad (2)$$
$$= R_0 \sin\left(D_0 + \sin^{-1}\frac{r_n}{R_0}\right) - r_n.$$

Thus, the sampling interval along the radial direction depends on the depth ($R_0$), the smooth perception threshold ($D_0$), and the radius ($r_n$) of the concentric mosaic.

More specifically, three observations can be made. First, non-linear sampling exists along the radial direction. Smaller hopping intervals are desirably used when the concentric mosaic radius is large, and larger intervals are desirably used when the radius is small. Second, the hopping interval can be increased as objects move further away. When objects are located at infinity, the interval becomes arbitrary because all concentric mosaics degenerate into the same panorama. Third, a larger threshold allows a larger hopping interval along the radial direction. As $D_0 \to 0$, the hopping interval goes to zero. At that stage, manifold hopping becomes equivalent to rendering with concentric mosaics. On the other hand, if it is not required to observe any parallax, a single manifold mosaic is sufficient for a user to look at any viewing direction.

As has been noted, desirably the choice of the threshold $D_0$ is closely related to the human visual system. For example, it is known that for a human to observe moving pictures, the frame rate is desirably at least 24 frames per second (it is noted that for video, the frame rate is typically 30 or 60 frames per second). Thus, if the average speed of rotation for a person to observe an environment is below 48 degrees per second, then $D_0$ is desirably 2 degrees. In other words, a person can tolerate 2 degrees of average pixel flow for two neighboring frames and still perceive smooth and continuous motion.

As an example, a particular scene is considered in which the radius of the outermost concentric mosaic is 1 unit and the objects are located at a distance of 4 units. If $D_0$ is 1.5 degrees, then $\Delta r=0.1$. Therefore, 21 concentric mosaics—two for each concentric circle and one for the center—are needed. It is noted that this is a significant reduction from the 320 rebinned concentric mosaics needed in rendering with concentric mosaics within the prior art.

Unlike the prior art, which utilizes view interpolation that combines rays from different views or images to render a new image, the manifold hopping approach of embodiments of the invention renders a novel view image by locally warping a single multiperspective image. This provides for continuous motion along the manifold. For example, a novel view image can be warped using the local rays captured on a single concentric mosaic, rather than interpolated by collecting rays captured from many concentric mosaics.

Local warping is sufficient because if the field of view is sufficiently small, then artifacts resulting from the warping are perceptive small to the human eye. This is now described in more detail, by first describing artifacts present with prior art view interpolation, and then comparing that situation with local warping according to embodiments of the invention. When the sampling rate is higher than the Nyquist frequency for plenoptic function reconstruction, view interpolation can create high-quality rendering results. But if the sampling interval between successive camera locations is too large, view interpolation results in visual aliasing artifacts, creating double images in the rendered image. For humans to perceive a picture correctly, it is known that the retinal projection of a two-dimensional image of an object should not contain any structural features that are not present in any retinal projection of the object itself. By contrast, human beings have a much larger degree of tolerance for other requirements for the perception of pictures, including direct view condition, foreshortening of objects, relative size of objects, verticality, etc. Double images, which are common from view interpolation with poor correspondence, results in perceived structural features in the observed objects, such as more noticeable edges, which leads to uncomfortable visual perception.

By comparison, manifold hopping in accordance with embodiments of the invention, does not result in such visual artifacts because locally warping a multiperspective image preserves structural features. Even though local warping may introduce geometric distortions because of imprecise geometric information, the amount of geometry distortion can be tolerated by human visual perception if the field of view is selected properly. Therefore, when moving on a given concentric mosaic, the horizontal field of view is desirably constrained within a certain range so that any distortion error introduced by local warping from a multiperspective image to a perspective image does not cause much visual discomfort for the user.

A distortion threshold $\eta_d$ is defined as the distance between two points, referred to as A and B, that are the projections of the rightmost pixel that are locally warped with distance $R_1$, which is the assume distance, and $R_2$, which is the corrected distance, respectively. The field of view of a radial hopping virtual camera desirably satisfies the following:

$$\Delta\theta = \theta_B - \theta_A \leq \eta_d \quad (3)$$

or, $$\sin^{-1}\frac{r_n}{R_2} - \sin^{-1}r_n - \frac{\Delta r}{R_2} - \sin^{-1}\frac{r_n}{R_1} + \sin^{-1}r_n - \frac{\Delta r}{R_1} \leq \eta_d \quad (4)$$

If parallel interpolation is applied to local warping, by assuming the depth $R_1$ at infinity, the above constraint can be simplified to $$\sin^{-1}\frac{r_n}{R_2} - \sin^{-1}\frac{r_2 - \Delta r}{R_2} \leq \eta_d \quad (5)$$

$$1 - \cos\left(\frac{Fov}{2}\right) = \frac{\Delta r}{r_n} \quad (6)$$

From the equations (5) and (6), the maximum field of view is derived under parallel interpolation as $$\cos\left(\frac{Fov}{2}\right) \geq \sqrt{\left(\frac{R_2}{r_n}\right)^2 - 1} \sin\eta_d - \cos\eta_d \quad (7)$$

Equation (7) shows that, under parallel interpolation, the maximum field of view for virtual camera hopping depends on the radius of the concentric mosaic, the scene depth, and the distortion error threshold. Thus, the field of view can be increased significantly when the object moves farther away. A smaller radius enables a larger field of view. For example, a panorama with a very large field of view can be rendered as the radius goes to zero. In addition, warping with constant depth (other than infinite depth) can further increase the maximum field of view.

For example, a scene that is located at a circle having a radius that is four times the radius of the outermost concentric mosaic is considered. If the distortion threshold is assumed to be 0.5 degrees, which is 2.5 pixels of flow for a mosaic with a width of 1800 pixels, the maximum allowed field of view is desirable 30 degrees. Thus, the perceptiveness of the human visual system does not require a very large field of view for a hopping virtual camera when wandering within a virtual scene, or environment. It is known that 36 degrees is close to perceptually optimal for most people.

As has been described thus far in this section of the detailed description, radial hopping using concentric mosaics has been described where the virtual camera is only rotatable along one of the concentric circles, and is not allowed to rotate at any given viewpoint except in the center. However, it is also possible to hop at any fixed point along the angular direction using concentric mosaics, in accordance with an embodiment of the invention. Hopping angularly at a fixed point can be accomplished by warping different concentric mosaics. In the signed Hough spaces, this is equivalent to find segments from different lines that approximate a sinusoidal curve. The number of concentric mosaics is desirably sufficiently large so that neighboring rendered frames have sufficient overlap to ensure continuous angular hopping, however.

Using a set of manifold mosaics to provide for virtual camera movement within a scene and around an object has been described in this section of the detailed description, in specific conjunction with manifold mosaics that are concentric mosaics. It is noted that such hopping as has been described is distinctive from point sampling, in at least that rendering a new image in accordance with embodiments of the invention is accomplished by synthesizing the image from a single manifold mosaic using local warping, as opposed to collecting the new image from several mosaics, as is accomplished in visual interpolation of two or more mosaics to generate a new image. It has been found that hopping generates images of better quality for human visual perception, even though selecting closer rays from multiple mosaics may be more justifiable from a theoretical perspective.

It is also noted that in this section of the detailed description, new image rendering has been described in implicit conjunction with environments or scenes in which a virtual camera is moved around a scene and looks outward, and with a two-dimensional environment in which the virtual camera is moved around within a plane. However, the invention is not so limited in either regard. Thus, in the next section of the detailed description, several extensions of manifold hopping are described, such as using manifold mosaics other than concentric mosaics, having a virtual camera that looks inward, and having virtual camera movement in dimensions higher than two.

Manifold Mosaics for IBR: Extensions

As has been noted, in the previous section of the detailed description, concentric mosaics were described in the context of cameras looking outward. In this section of the detailed description, extensions to the embodiment of the previous section are described. In particular, the use of concentric mosaics in the context of cameras looking inward, and the use of parallel projection mosaics, are described.

For the use of concentric mosaics as the manifold mosaics in the context of cameras looking inward, such as when observing an object from the outside at different viewing angles, the motion of the virtual camera is constrained somewhat differently than when concentric mosaics are used in the context of cameras looking outward, such as when observing a scene or environment from inside the scene or environment. Specifically, the virtual camera is allowed to have continuous motion along the radial direction, but only discrete motion in the angular direction. This is the opposite to the use of concentric mosaics described in the previous section, where motion along the radial direction was discrete, and motion along the angular direction was continuous.

Thus, an issue in the use of concentric mosaics as the manifold mosaics in the context of cameras looking inward is to determine the hopping interval for angular hopping (which is hopping in the angular direction) such that perceived smooth transition is maintained between images. For two neighboring cameras A and B located along a first circle with radius R (i.e., such as on a concentric mosaic), having a center point O, the object is presumed to be at a concentric circle, thus also with center point O, with radius r of constant depth. Therefore, OA=OB=R. A line tangential to the second circle that also runs through A is said to be on a point $A_1$ of the second circle, and likewise a line tangential to the second circle that also runs through B is said to be on a point $B_2$ of the second circle. Therefore, $OA_1=OB_1=r$. The camera spacing is $\alpha=\angle AOB=\angle A_1 OB_1$. Furthermore, $\beta=\angle A_1 AO$, and $\sin \beta = r/R$. The angular flow between two images is approximated as $$\Delta\theta \approx 2\beta \frac{\overline{AB}}{\overline{AC}} = 2\beta \frac{\alpha}{\pi - 2\beta}. \tag{8}$$

Therefore, given the threshold $D_0$, the camera space is obtained as $$\alpha = \left(\frac{\pi}{2\beta} - 1\right) D_0. \tag{9}$$

As an example, if $D_0$ is 1 degree, and R=3r, then α is determined as 4 degrees. That is, 90 images need to be capture along the circle (360 degrees divided by 4 degrees).

Next, hopping between parallel projection mosaics as the manifold mosaics is described. This type of hopping is another manner by which to achieve continuous radial motion. Parallel mosaics can be formed by collecting all parallel rays in the same direction. This can also be referred to as angular hopping with parallel mosaics. It is noted that parallel projection cameras are not commonly available. Therefore, parallel mosaics are rebinned by taking the parallel rays from a dense sequence of perspective images taken along a circle outside an object. Assuming a constant depth for the object, parallel mosaics can then be reprojected to any new view along the radial direction. The rebinned mosaic is itself called a one-dimensional (1D) parallel mosaic because the vertical direction is still perspective—only the horizontal direction is under parallel projection. Warping a 1D parallel mosaics does create some warping errors, however they are small enough to cause little visual distortion.

As a third extension to the embodiment of the invention described in the previous section of the detailed description, it is noted that manifold mosaic hopping can be generalized to higher dimensions. Manifold mosaic hopping has been described in the context of two-dimensional (2D) space by constraining the rendering camera on a plane. However, as an example, to observe an object from outside, a viewing sphere, as opposed to a viewing circle, can be used to construct more parallel mosaics. In such an example, the rendering camera is allowed freedom of movement in three dimensions, and not just constrained to two. The invention is amenable to such higher dimensionality.

Methods

In this section of the detailed description, methods according to varying embodiments of the invention are described. The methods are operative in conjunction with the manifold hopping embodiments of the invention described in the previous sections of the detailed description. In one embodiment, the methods can be computer-implemented methods. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 11:
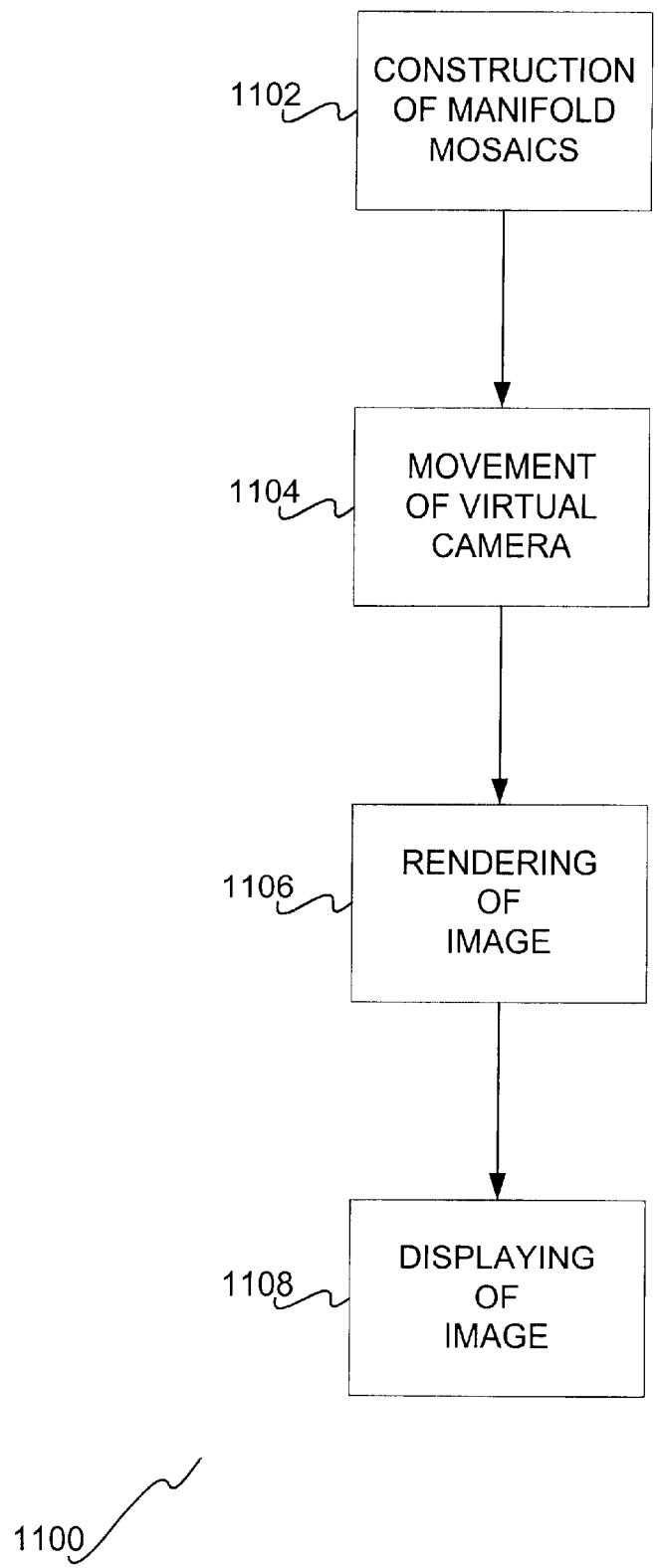

Referring to FIG. 11, a flowchart of a method 1100, according to one embodiment of the invention, is shown. In 1102, a set of manifold mosaics is constructed. The manifold mosaics have a predetermined spatial relationship. For example, in the case of concentric mosaics, the predetermined spatial relationship is that such mosaics are concentric to one another. As another example, the manifold mosaics can be parallel mosaics, such that the predetermined spatial relationship is that they are parallel to one another. Each mosaic represents a plurality of unique viewpoints that differ from one another in only one direction. For example, in the context of concentric mosaics, the viewpoints of a given mosaic differ along the angular direction, and have the same value for the radial direction. Furthermore, as has been described, desirably there is a maximum distance between adjacent mosaics based on a predetermined smooth perception threshold related to the human visual system.

In 1104, a virtual camera is moved from a current position within the set of manifold mosaics, to a new position. The movement is such that it is continuous over any one mosaic, and is discrete across mosaics. In one embodiment, the movement is either continuous movement over one mosaic, or discrete movement across mosaics, but not both. In the context of concentric mosaics, for example, radial movement across mosaics is discrete, also referring to as hopping, and movement on a (circular) mosaic is continuous. In 1106, a new image at the new position of the virtual camera is rendered, by locally warping a mosaic represented by the new position of the camera, without view interpolation of a number of mosaics, as has been described in previous sections of the detailed description. Finally, in 1108, this new rendered image can be displayed to the user, for example, on a display device of a computer.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for rendering an image comprising:

constructing a set of manifold mosaics having a predetermined spatial relationship, each mosaic representing a plurality of unique viewpoints that differ from one another in only one direction;

from a current position within the set of manifold mosaics, moving to a new position within the set of manifold mosaics, such that movement is continuous over one mosaic and is discrete across mosaics; and, rendering the image based on the new position within the set of manifold mosaics, by locally warping a mosaic represented by the new position within the set of mosaics, without interpolation of more than one mosaic.

2. The method of claim 1, wherein for any two adjacent mosaics of the set of manifold mosaics, there is a maximum distance between the two adjacent mosaics based on a predetermined smooth perception threshold related to a human visual system.

3. The method of claim 1, such that the movement is one of only continuous movement over one mosaic and only discrete movement across mosaics.

4. The method of claim 1, wherein the set of manifold mosaics comprises a set of concentric mosaics, such that the predetermined spatial relationship comprises each of the concentric mosaics having a common center point.

5. The method of claim 4, wherein the plurality of unique viewpoints of each mosaic differ from one another only in an angular direction of a predetermined a (radial direction, angular direction) ray space.

6. The method of claim 5, wherein the movement comprises movement in an angular direction around a fixed point within the set of manifold mosaics.

7. The method of claim 5, wherein for any two adjacent mosaics of the set of manifold mosaics, there is a maximum distance between the two adjacent mosaics represented by $$R_0 \sin\left(D_0 + \sin^{-1}\frac{r_n}{R_0}\right) - r_n,$$

where $R_0$ represents depth, $D_0$ represents a predetermined smooth perception threshold, and $r_n$ represents one of the two adjacent mosaics.

8. The method of claim 7, wherein the predetermined smooth perception threshold is based on humanly perceived visual smoothness.

9. The method of claim 1, wherein the set of manifold mosaics comprises a set of parallel mosaics, such that the predetermined spatial relationship comprises the set of parallel mosaics being parallel to one another.

10. The method of claim 9, wherein for any two adjacent mosaics of the set of manifold mosaics, there is a maximum angle between the two adjacent mosaics represented by $$\left(\frac{\pi}{2\beta} - 1\right)D_0,$$

wherein $D_0$ represents a predetermined smooth perception threshold.

11. The method of claim 1, further comprising displaying the image rendered.

12. A machine-readable medium having instructions stored thereon for execution by a processor to perform a method for rendering an image within a set of manifold mosaics having a predetermined spatial relationship, each mosaic representing a plurality of unique viewpoints that different from one another in only one direction, the method comprising:

from a current position within the set of manifold mosaics, moving to a new position within the set of manifold mosaics, such that movement is continuous over one mosaic and is discrete across mosaics;

rendering the image based on the new position within the set of manifold mosaics, by locally warping a mosaic represented by the new position within the set of manifold mosaics, without interpolation of more than one mosaic; and, displaying the image rendered.

13. The medium of claim 12, such that the movement is one of only continuous movement over one mosaic and only discrete movement across mosaics.

14. The medium of claim 12, wherein the set of manifold mosaics comprises a set of concentric mosaics, such that the predetermined spatial relationship comprises each of the concentric mosaics having a common center point.

15. The medium of claim 14, wherein the plurality of unique viewpoints of each mosaic differ from one another only in an angular direction of a predetermined a (radial direction, angular direction) ray space.

16. The medium of claim 15, wherein the movement comprises movement in an angular direction around a fixed point within the set of manifold mosaics.

17. The medium of claim 15, wherein for any two adjacent mosaics of the set of manifold mosaics, there is a maximum distance between the two adjacent mosaics represented by $$R_0 \sin\left(D_0 + \sin^{-1}\frac{r_n}{R_0}\right) - r_n,$$

where $R_0$ represents depth, $D_0$ represents a predetermined smooth perception threshold, and $r_n$ represents one of the two adjacent mosaics.

18. The medium of claim 12, wherein the set of manifold mosaics comprises a set of parallel mosaics, such that the predetermined spatial relationship comprises the set of parallel mosaics being parallel to one another.

19. The medium of claim 18, wherein for any two adjacent mosaics of the set of manifold mosaics, there is a maximum angle between the two adjacent mosaics represented by $$\left(\frac{\pi}{2\beta} - 1\right)D_0,$$

wherein $D_0$ represents a predetermined smooth perception threshold.

20. A computer-implemented method for rendering an image comprising:

constructing a set of concentric manifold mosaics, each mosaic representing a plurality of unique viewpoints that differ from one another in only an angular direction of a (radial direction, angular direction) ray space;

from a current position within the set of concentric manifold mosaics, moving to a new position within the set of concentric manifold mosaics, such that movement is continuous over one mosaic and is discrete across mosaics; and, rendering the image based on the new position within the set of concentric manifold mosaics, by locally warping a mosaic represented by the new position within the set of concentric manifold mosaics, without interpolation of more than one mosaic.

21. The method of claim 20, wherein for any two adjacent mosaics of the set of concentric manifold mosaics, there is a maximum distance between the two mosaics based on a predetermined smooth perception threshold related to a human visual system.

22. The method of claim 20, such that the movement is one of only continuous movement over one mosaic and only discrete movement across mosaics.

23. The method of claim 20, wherein the movement comprises movement in an angular direction around a fixed point within the set of concentric manifold mosaics.

24. The method of claim 20, wherein for any two adjacent mosaics of the set of concentric manifold mosaics, there is a maximum distance between the two adjacent mosaics represented by $$R_0 \sin\left(D_0 + \sin^{-1}\frac{r_n}{R_0}\right) - r_n,$$

where $R_0$ represents depth, $D_0$ represents a predetermined smooth perception threshold, and $r_n$ represents one of the two adjacent mosaics.

25. The method of claim 20, further comprising displaying the image rendered.

* * * * *

UNITED STATES PATENT AND TRADEMARK OFFICE
CERTIFICATE OF CORRECTION

PATENT NO.    : 6,643,413 B1
DATED         : November 4, 2003
INVENTOR(S)   : Shum et al.

It is certified that error appears in the above-identified patent and that said Letters Patent is hereby corrected as shown below:

Column 10,
Line 35, equation should appear as follows:

$$\sin^{-1}\frac{r_n}{R_2} - \sin^{-1}\frac{r_n - \Delta r}{R_2} - \sin^{-1}\frac{r_n}{R_1} + \sin^{-1}\frac{r_n - \Delta r}{R_1} \leq \eta_d \qquad (4)$$

Line 43, equation should appear as follows:

$$\sin^{-1}\frac{r_n}{R_2} - \sin^{-1}\frac{r_n - \Delta r}{R_2} \leq \eta_d \qquad (5)$$

Signed and Sealed this

Second Day of March, 2004

JON W. DUDAS
*Acting Director of the United States Patent and Trademark Office*